United States Patent [19]

Waldert et al.

[11] Patent Number: 5,417,502
[45] Date of Patent: May 23, 1995

[54] CAGE FOR FULL-TYPE ROLLER BEARINGS

[75] Inventors: Hartwig Waldert, Aisch; Leo Muntnich, Aurachtal; Jurgen Lechner, Dachsbach; Hanns Seegers, Herzogenaurach, all of Germany

[73] Assignee: Ina Walzalager Schaeffler KG, Germany

[21] Appl. No.: 211,360

[22] PCT Filed: Aug. 7, 1992

[86] PCT No.: PCT/JP92/01802
§ 371 Date: Mar. 30, 1994
§ 102(e) Date: Mar. 30, 1994

[87] PCT Pub. No.: WO93/07399
PCT Pub. Date: Apr. 15, 1993

[30] Foreign Application Priority Data

Oct. 9, 1991 [DE] Germany .................. 41 33 443.4

[51] Int. Cl.[6] .................................. F16C 33/46
[52] U.S. Cl. .................................. 384/572
[58] Field of Search ............... 384/572, 580, 575, 576, 384/578, 579

[56] References Cited

U.S. PATENT DOCUMENTS 4,613,239  9/1986  Hofmann et al. .................. 384/580

Primary Examiner—Lenard A. Footland
Attorney, Agent, or Firm—Bierman and Muserlian

[57] ABSTRACT

The invention concerns a cage for full-type roller bearings comprising pockets formed by crossbars, into which pockets peripheral sections of cylindrical rolling elements extend, the cage being arranged radially inside or outside of a pitch circle of the rolling elements.

3 Claims, 1 Drawing Sheet

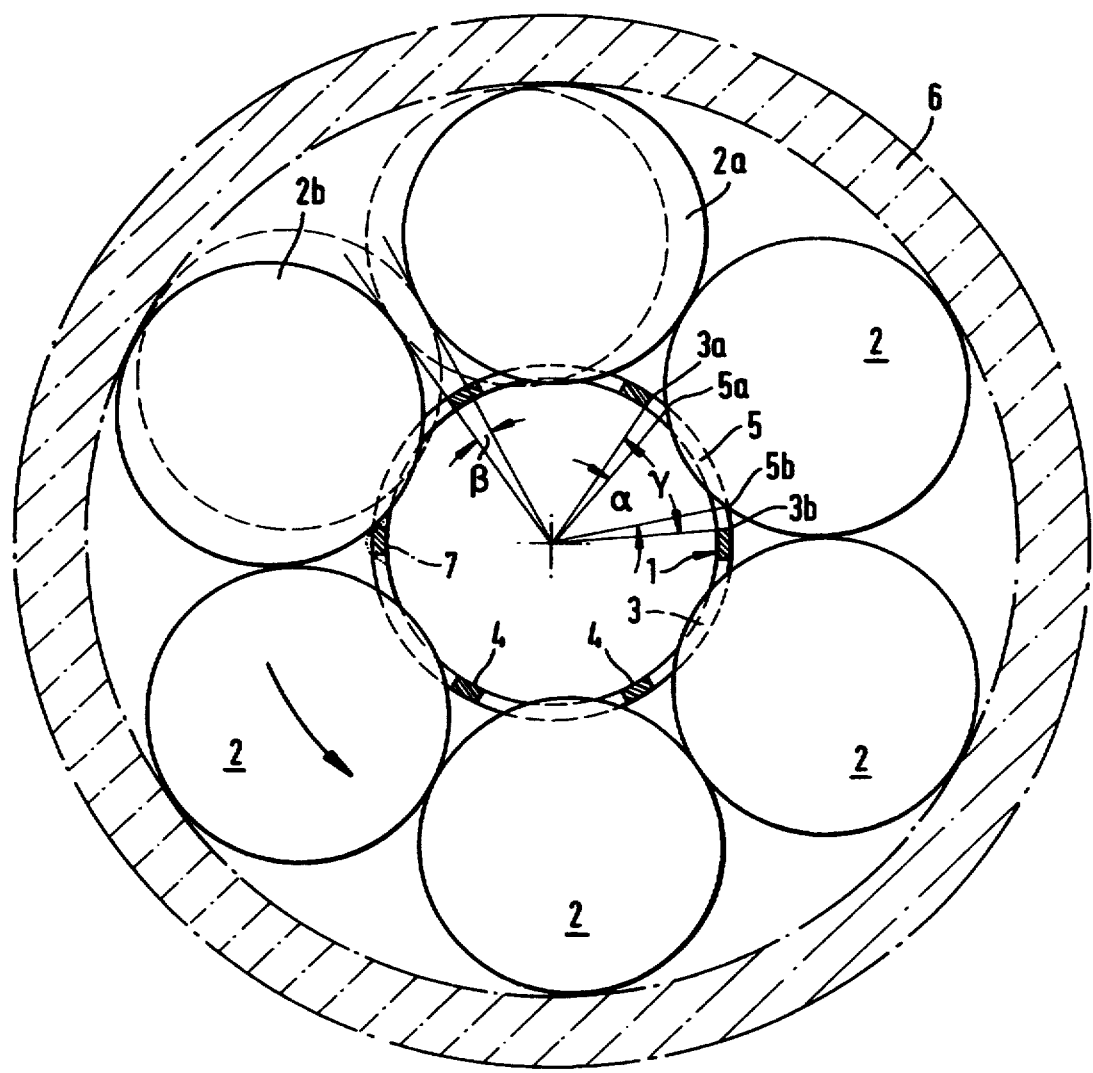

CAGE FOR FULL-TYPE ROLLER BEARINGS

The invention concerns a cage for full-type roller bearings comprising pockets formed by crossbars, into which pockets peripheral sections of cylindrical rolling elements extend, the cage being arranged radially inside or outside of a pitch circle of the rolling elements.

Among other things, the load rating of rolling beatings depends essentially also on the number of rolling elements arranged therein. Full-type roller bearings contain the maximum number of rolling elements possible and therefore offer a theoretically optimum load rating. Due to the possibility of joggling of the cylindrical rolling elements, however, clear reductions in the load rating have to be tolerated. Another disadvantage of full-type rolling bearings is the friction between contiguous rolling elements at their points of contact at which their peripheral surfaces rub against each other in opposite directions of rotation. Moreover, the mounting of full-type roller bearings frequently proves to be problematic.

To eliminate these disadvantages, it is a common practice to refrain from using the maximum number of rolling elements possible and to utilize the space thus gained as compared to a full-type construction, to accommodate a cage which prevents the joggling of the cylindrical rolling elements and their rubbing against each other and which cage, moreover, retains the rolling elements together in a manner conducive to mounting.

During the rotation of a rolling bearing, the rolling elements alternately traverse a load and a non-load zone, the loading of the individual rolling elements increasing continuously starting from the entry into the load zone to reach the maximum value in the position of the peak-level rolling element. From there on, the load decreases till it is reduced to zero in the load-free zone. Corresponding to the rolling element loading, an elastic deformation of the raceways also results. This leads to the individual rolling elements having different speeds of rotation even with a constant rotational speed of the bearing. Even though these differences in speed are only minimal, they still cause a change in the distance between the individual rolling elements, particularly in the load zone. Due to the frictional forces between the rolling elements and their raceways, the rolling elements tend to bring about these changes in distance even against any existing resistances. Such resistances are constituted by the crossbars of the cage. In common types of cages, this implies a high loading of the crossbars and for this reason, one accepts a smaller number of rolling elements in order to be able to make the crossbars sufficiently wide so that they can withstand this loading. For the dimensioning of the crossbars in a cage construction for full-type rolling bearings, one is restricted to the space outside or inside the Ditch circle between any two closely adjacent rolling elements, a certain play between pockets also having to be taken into account. By the largest possible utilization of the space outside or inside the pitch circle between two mutually abutting rolling elements and the respective raceway, the highest possible strength of the crossbars is obtained.

A full-type roller bearing of the are-cited type is known from DE-OS 28 31 183. In this rolling bearing, one tolerates the increased friction caused by the opposing movement of the contiguous rolling element surfaces but obtains that the filigree-type cage at least retains the rolling elements in a position conducive to mounting. To couteract the described thrust forces of the rolling elements, the crossbars are given the largest possible cross-section, that is to say, also the width of the cage pockets is made as small as possible so that they only just about permit the rolling of the rolling elements. In such a construction, there exists the risk that the crossbars break for the reasons mentioned above, particularly if under high loading of the bearing, the differing rolling element speeds are accompanied by large forces.

The object of the invention is to provide a cage for a full-type roller bearing in which the crossbars are not damaged even with differing rotational speeds of the individual coiling elements.

This object is achieved with a cage for full-type roller bearings of the pre-cited type by the fact that, with a central point of a bearing as a point of reference in each case, an angle is formed between edges of the pockets facing the rolling elements which is at least equal to the sum of an angle formed between the end points of the peripheral section and an angle subtended by an end play which is the play between a first and a last rolling element of a row of contiguous rolling elements. In this way it is obtained that a loading of a crossbar or of different crossbars in opposite directions is not possible. An individual crossbar, or in special cases, even all the crossbars of the cage can only be loaded in the direction of progressive movement, and only by the force which is required for entraining the cage. Such an arrangement of the cage is obtained according to the invention by the fact that each pocket has at least a width that permits the rolling of the rolling elements, plus a supplementary width corresponding to the end play in the row of contiguous rolling elements. The result of this is that, even when all the rolling elements of the cage are in close contact with one another, except at the gap formed by the end play, only the respective last rolling element in the direction of rotation is in contact with the cage. Since the rest of the rolling elements have no contact with the cage, no loading of the cage crossbars in the opposite direction occurs and there is no danger of their being rolled over or of their breaking.

In a further development of the invention, the crossbars can be made integrally with the cage by stamping. The crossbars of the cage can be adapted in shape to the contour of the outer periphery of the neighbouring rolling elements. Thus the crossbars comprise curved surfaces which extend to near the point of contact of the two rolling elements concerned, and against which surfaces the respective rolling elemnt which entrains the cage can bear. In this way pointwise loading is avoided.

It is possible to combine individual features with the advantageous features stated and the features additionally listed in connection with the examples of embodiment.

BRIEF DESCRIPTION OF THE DRAWING

The drawing is a simplified representation or two different examples of embodiment. The sole figure shows a cage 1 for a full-type roller bearing in which a total of six rolling elements 2 are lodged in pockets 3. Each of these pockets 3 is delimited in the peripheral direction by crossbars 4. The cage 1 is inside-guided so that a peripheral section 5 in the radially inner region of each rolling element 2 extends into a pocket 3. Each of these peripheral sections comprises end points 5a and 5b formed at the points of intersection of the outer periphery of the rolling element and the outer periphery of the cage. The pockets comprise edges 3a and 3b.

It can be seen in the drawing that the rolling elements 2 which rotate within an outer ring 6 form a row in which they are contiguous to one another, that is to say, these rolling elements 2 are in contact with one another at their peripheries. Between the first and the last rolling element, 2a and 2b, there is an end play which, in the region of a pitch circle of these rolling elements, is also called a pitch circle end play.

According to the invention, with the central point of the bearing as a point of reference, an angle $\alpha$ is determined between the end points 5a and 5b of the peripheral section. To this angle $\alpha$, an angle $\beta$ is added which is formed between the two rolling elements 2a and 2b by projecting spoke-like tangents from the central point of the bearing to the periphery of these two rolling elements 2a and 2b. The angle $\gamma$ defined between the pocket edges 3a and 3b with reference to the central point of the bearing is equal to the sum of the two angles $\alpha$ and $\beta$ with a small tolerance addition.

The crossbars 4 are configured as circular ring-shaped segments.

The drawing further shows another variant off a crossbar 7 only roughly represented. This crossbar 7 is adapted in shape to the outer contour of the respective neighbouring rolling element to obtain an optimum cross-section.

To sum up, it can be seen from the figure that by reason of the pocket width defined by the angle $\gamma$, only the last rolling element 2b of the row of rolling elements 2 contacts a crossbar, in this case, the crossbar 7 which has the special configuration. The rest of the crossbars are not contacted by any of the rolling elements 2. If these conditions change due to differing rotational speeds of the rolling elements so that the first rolling element 2a bridges the end play and contacts the rolling element 2b, contact is established between the rolling element 2a and the corresponding crossbar while all the other crossbars 4 and 7 are no longer in contact with any of the rolling elements 2. Thus no mutually opposed forces occur at the cage 1 and the crossbars 4 and 7 are not subjected Lo any high loads.

We claim:

1. A cage (1) for full-type roller bearings comprising pockets (3) formed by crossbars (4, 7), into which pockets (3) peripheral sections (5) of cylindrical rolling elements (2, 2a, 2b) extend, the cage (1) being arranged radially inside or outside of a pitch circle of the rolling elements (2, 2a, 2b), characterized in that, with a central point of a bearing as a point of reference in each case, an angle ($\gamma$) is formed between edges (3a and 3b) of the pockets (3) facing the rolling elements (2, 2a, 2b) which is at least equal to a sum of an angle ($\alpha$) formed between end points (5a and 5b) of the peripheral section (5) and an angle ($\beta$) subtended by an end play which is the play between a first and a last rolling element (2a and 2b) of a row of contiguous rolling elements (2).

2. A cage of claim 1 wherein the crossbars (4, 7) are made integrally with the cage by stamping.

3. A cage of claim 1 wherein the crossbars (7) have a segment-like configuration and are adapted in shape to an outer contour of the rolling elements.

* * * * *